(12) United States Patent
Felger

(10) Patent No.: US 11,942,978 B1
(45) Date of Patent: Mar. 26, 2024

(54) PHONE STRAP

(71) Applicant: Steven Felger, Solana Beach, CA (US)

(72) Inventor: Steven Felger, Solana Beach, CA (US)

( * ) Notice: Subject to any disclaimer, the term of this patent is extended or adjusted under 35 U.S.C. 154(b) by 467 days.

(21) Appl. No.: 17/390,981

(22) Filed: Aug. 1, 2021

Related U.S. Application Data

(60) Provisional application No. 63/061,164, filed on Aug. 4, 2020.

(51) Int. Cl.
| | |
|---|---|
| *G03B 17/56* | (2021.01) |
| *F16M 13/04* | (2006.01) |
| *H04B 1/3827* | (2015.01) |
| *H04B 1/3888* | (2015.01) |
| *H04M 1/05* | (2006.01) |
| *A45F 3/14* | (2006.01) |

(52) U.S. Cl.
CPC ............ *H04B 1/385* (2013.01); *F16M 13/04* (2013.01); *H04B 1/3888* (2013.01); *H04M 1/05* (2013.01); *A45F 3/14* (2013.01); *A45F 2003/142* (2013.01)

(58) Field of Classification Search
USPC ......................................................... 396/420
See application file for complete search history.

(56) References Cited

U.S. PATENT DOCUMENTS

| | | | |
|---|---|---|---|
| 3,672,269 A | 6/1972 | Tabankin | |
| 6,880,737 B2 * | 4/2005 | Bauer | A45F 5/021 224/269 |
| 7,334,714 B2 * | 2/2008 | Brown | A45C 13/30 224/625 |
| 7,753,759 B2 * | 7/2010 | Pintor | A41C 3/0035 450/89 |
| 8,256,611 B2 | 9/2012 | Merrill et al. | |
| 8,342,758 B2 * | 1/2013 | Braithwaite | G03B 17/561 396/419 |
| 9,833,059 B2 * | 12/2017 | Westbrook | A45F 5/021 |
| 2008/0006668 A1 | 1/2008 | Nowacki et al. | |
| 2012/0104058 A1 * | 5/2012 | Hernandez | A45F 5/00 224/660 |
| 2012/0152995 A1 | 6/2012 | Wilson | |
| 2012/0217274 A1 * | 8/2012 | Cipes | A45F 3/047 224/257 |
| 2014/0027479 A1 | 1/2014 | Hogue | |

(Continued)

FOREIGN PATENT DOCUMENTS

| | | |
|---|---|---|
| CA | 2828521 | 12/2012 |
| CN | 104660815 A * | 5/2015 |

OTHER PUBLICATIONS

Web page screen shot, Jul. 2020, www.bestbuy.com/site/spibelt-adult-with-window-case-for-most-cell-phones-heather.

(Continued)

*Primary Examiner* — Clayton E. LaBalle
*Assistant Examiner* — Warren K Fenwick
(74) *Attorney, Agent, or Firm* — Clause Eight; Michael Catania

(57) ABSTRACT

A phone strap for concealing a mobile phone is disclosed herein. The phone strap comprises a main body and a cover. The main body defines an internal compartment in an upper front section. The main body also has a lens aperture therethrough to the internal compartment. The cover is positioned over the lens aperture.

24 Claims, 15 Drawing Sheets

(56) References Cited

U.S. PATENT DOCUMENTS

2015/0358452 A1* 12/2015 Kranz .................... A61B 5/316
  600/382

OTHER PUBLICATIONS

Web page screen shot, Jul. 2020, colorado-outfitters.us/products/sports-waist-bags-mobile-phone-pouch.
Web page screen shot, Jul. 2020, ebay.com/i/303270588420?chn=ps&var=602266789746.
Web page screen shot, Jul. 2020, ebay.com/i/401768331401?chn=ps.
Web page screen shot, Jul. 2020, www.proaim.ca/products/flycam-body-pod.
Web page screen shot, Jul. 2020, hasbeentobuy.com/products/womens-moible-phone-bag.
Web page screen shot, Jul. 2020, www.kickstarter.com/projects/erikvonk/3rd-person-view-action-cam-camera-mount-for-extrem-0.
Web page screen shot, Jul. 2020, www.voguesbox.com/crossbody-bags/3901-sling-bag-chest-shoulder-backpack-fanny-pack-crossbody-bags-for-men-black-cv1201186ck.
Web page screen shot, Jul. 2020, www.wish.com/prouct/5d328b4f6262f5593cb195f7?from_ad=goog.

* cited by examiner

PHONE STRAP

CROSS REFERENCE TO RELATED APPLICATION

The Present application claims priority to U.S. Provisional Patent Application No. 63/061,164, filed on Aug. 4, 2020, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to phone straps.

Description of the Related Art

Hands-free use of the phone's features in first and third-person view is a problem.

An active mobile phone user trying to stay present in the environment while using a mobile phone to capture video, photos, live recording and other phone voice-control features has no good way to be hands-free and stylish because the current garments and apparel do not perform the function of holding the phone for active use while being stored, are not fashionably designed, or do not provide the benefits/utility in minimal or convenient forms which makes user's feel frustrated, restricted, or missing the moment, interruptive.

BRIEF SUMMARY OF THE INVENTION

The 'Phone Flash Strap' enables active cell phone users to inconspicuously carry their cell phone, and other essential items, in a way that conceals its presence and also enables the functionality of the camera "lens" and innate voice-controlled features. The 'Ready Phone Flash Strap' also includes a third-person view "selfie-arm" support that extends to allow/hold the user's phone in front of them for cell phone use. Each utility is designed to allow use of the mobile device's hands-free features, perpendicular resting position, Bluetooth slide functionality, and/or modularity component.

One aspect of the present invention is a phone strap for concealing a mobile phone. The phone strap comprises a main body and a cover. The main body defines an internal compartment in an upper front section. The main body also has a lens aperture therethrough to the internal compartment. The cover is positioned over the lens aperture. The internal compartment is configured to hold a mobile phone with a camera of the mobile phone positioned at the lens aperture. The cover is designed to conceal the lens aperture while permitting lens' functionality through the cover.

Another aspect of the present invention is a garment for concealing a mobile phone. The garment comprises a main body defining an internal compartment in an upper front section, the main body also having a lens aperture therethrough to the internal compartment. The internal compartment is configured to hold a mobile phone with a camera and all lens features of the mobile phone positioned at the lens aperture. The lens aperture is concealed while permitting lens' functionality.

Yet another aspect of the present invention is a phone strap with an extendable arm. The phone strap comprises a main body and an extendable arm. The main body has an upper section and lower section. The extendable arm is attached at the upper section and the lower of the main body, the extendable arm comprising an extension arm with a phone holder, a structural support member and an under structural support member. The extendable arm is designed to rest on the main body in a resting state, and extending forward from a body of user in an extended state.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
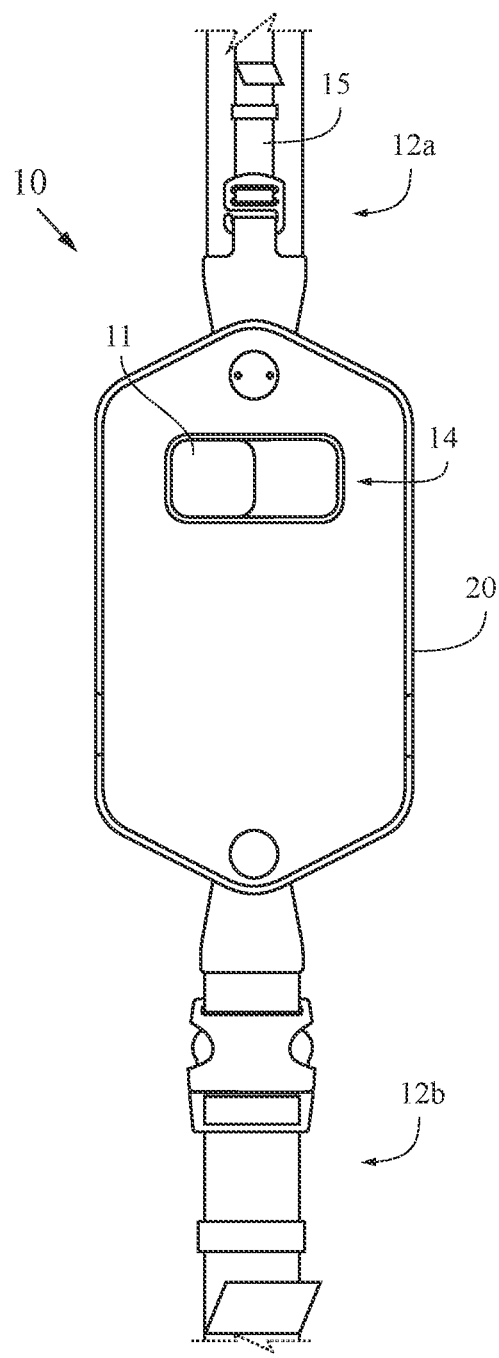
FIG. 1 is an illustration of the front-side of an embodiment of a phone strap worn by a user.
Figure 2:
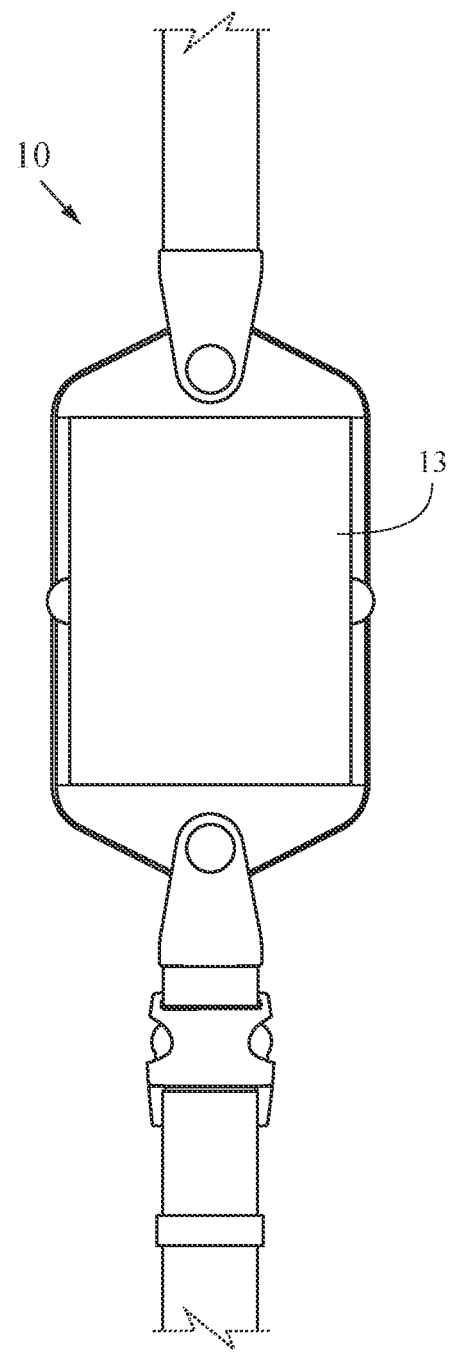
FIG. 2 is an illustration of the back-side of an embodiment of a phone strap worn by a user.
Figure 3:
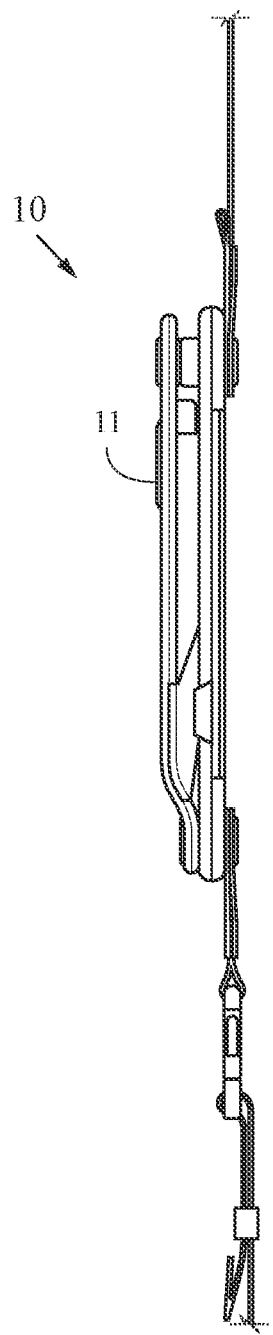
FIG. 3 is an illustration of a side view of an embodiment of a phone strap worn by a user.
Figure 4:
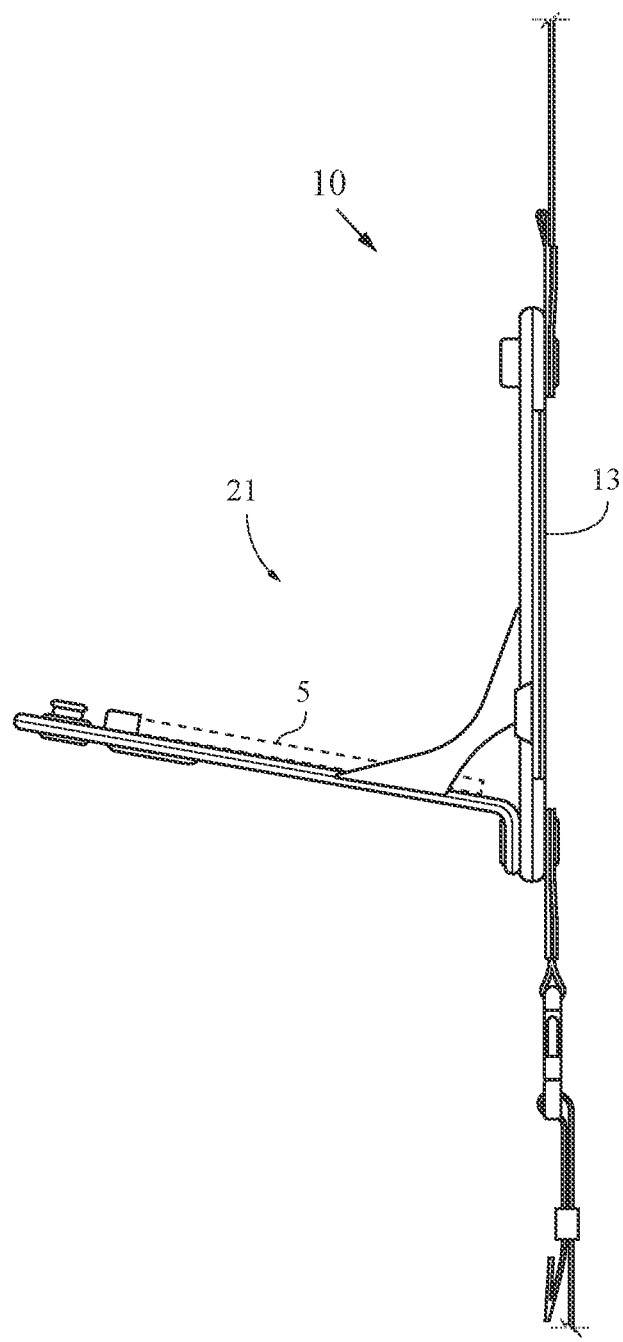
FIG. 4 is an illustration of FIG. 3 in an open position.
Figure 5:
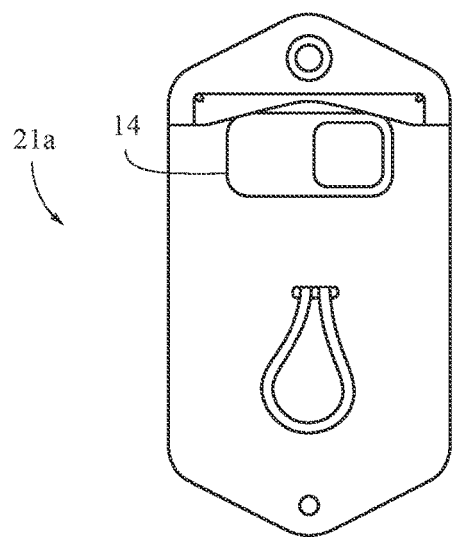
FIG. 5 is an illustration of the interior detail of the main body of FIG. 1.
Figure 6:
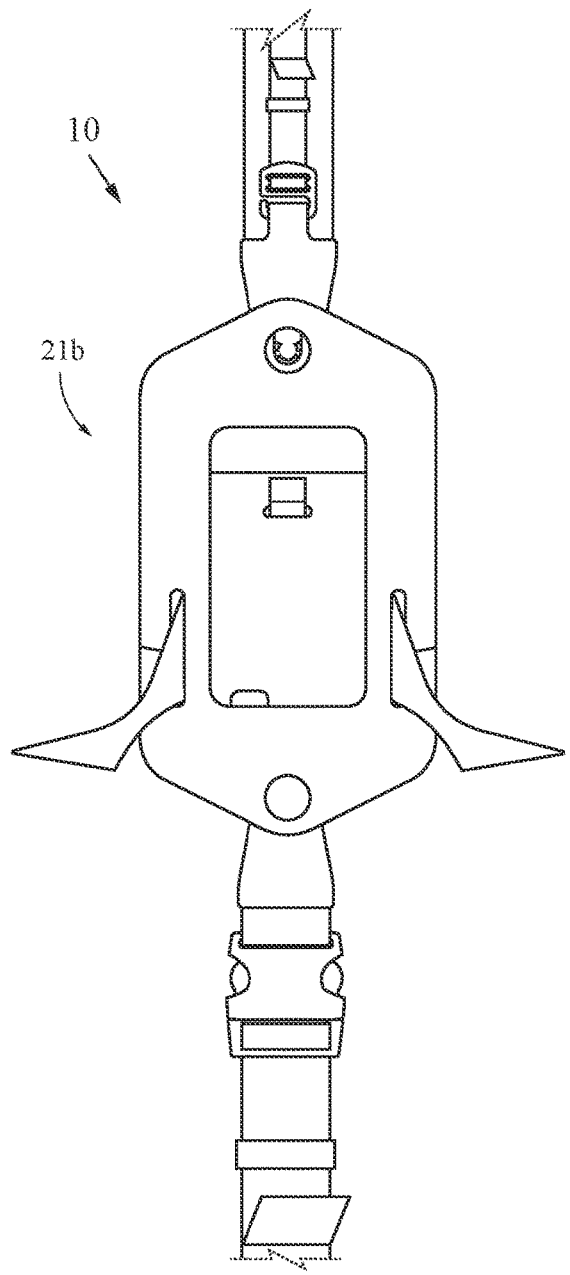
FIG. 6 is an illustration of the interior detail of the main body of FIG. 1.

The 'Phone Flash Strap' was invented to enable active cell phone users to inconspicuously carry and utilize their cell phone and camera "lens" features. The motivation for the 'Phone Flash Strap' includes the following. First and foremost, to enable civilians to capture photos and video in light of recent excessive use of force by police and for the benefit of the many perspectives and real-time witness evidence. By keeping all essential items in a cross-body strap, users will not have to hold small personal items (ID, credit card, cell phone, etc.) in their pockets and therefore not have to reach for them.

The additional motivation is to provide a foundation and support utility for using the phone's voice activated hands-free controls. We will never advance with phone voice-activated controls (the future) if we do not have a convenient and supportive "holder".

The first person and third-person point of view hands-free functionality allows users to be present to their environment and capture photos and videos without interrupting the moment. Phone video calls and third-person video/pictures are increasing and a hands-free phone support is needed.

Industry professionals such as security guards, package delivery personnel, or other active professionals where the phone is, or could be part of their job, will find efficiencies in their workday without needing to get their phone in and out (e.g. an Amazon delivery driver may hold a package in front of them and scan packages while the phone is in the 'Phone Flash Strap').

The technology in the present invention includes a concealed design, utilization of a phone's features while 'put away', and a concealed hands-free "selfie arm". Handicapped or lesser abled individuals can use this product as a 'third eye' and/or 'third hand' to support everyday interactions. Those blind or with low visibility may use the lens feature to receive guidance regarding items in front of them. Those with physical handicaps may benefit from a support structure to hold their phone in the perpendicular 'dashboard' position or third-person position via the selfie arm.

Users desire to have phone and features more conveniently available. Having one's phone readily available to use is a necessity, not having the phone "handy" presents a problem with increasing phone use. Phone and phone camera users are too frequently 'putting-away' and 'getting-out' their devices from pockets, purses, or other holders. While phones are 'put-away', users do not have functional use or utility of their phone, although the technology exists. The phone is used in a common place/vicinity, but not kept readily available and accessible.

There is a growing desire and need to be ready to capture video and photos in an instance/on a moment's notice, as well as be able to do so hands-free, thereby still being fully available and present in one's environment. There is a need for hands-free and voice automated mobile device use, eliminating having to reach for one's phone.

Hands-free technology interaction is underutilized despite increasing towards the tipping point. Technology is underutilized because there lacks adequate "hands-free" holders which enable or encourage voice-commands/interaction. General consumers are increasingly adopting "talk-to-text" or voice controlled technology interaction (Google home, Siri, talk to text, talk to car, voice notes).

Third-person (self-view) recording and camera use is on the rise and no convenient products exist. The technology to do so is not at an average-consumer level of convenience. People are recording video, pictures, and using live recording technology. As we become 'increasingly social' and 'individual sharing' increases, there will be a demand for third-person capabilities.

Existing wearable technology isn't fashionable. Existing camera straps and/or chest mounts for first or third person view are not stylish and can't be worn regularly. Current self-view camera mounts are not fashionable. Current mobile device or camera mounts, tripods or other extendible products are not designed to conceal or limit visibility of the product features/elements. There is also a focus on the wrong features of use over human wear/design. Current fashion doesn't provide modern functions or features that are wanted and available to consumers. Functional use of a cell phone holder, a purse, or a fanny pack is limited.

In the present invention, the phone 5 will be concealed by the external design of the strap/pack 10, as shown in FIGS. 1-6. In FIGS. 10-11 and FIGS. 15-22, additional embodiments of the strap/pack 10 are shown.

Figure 27:
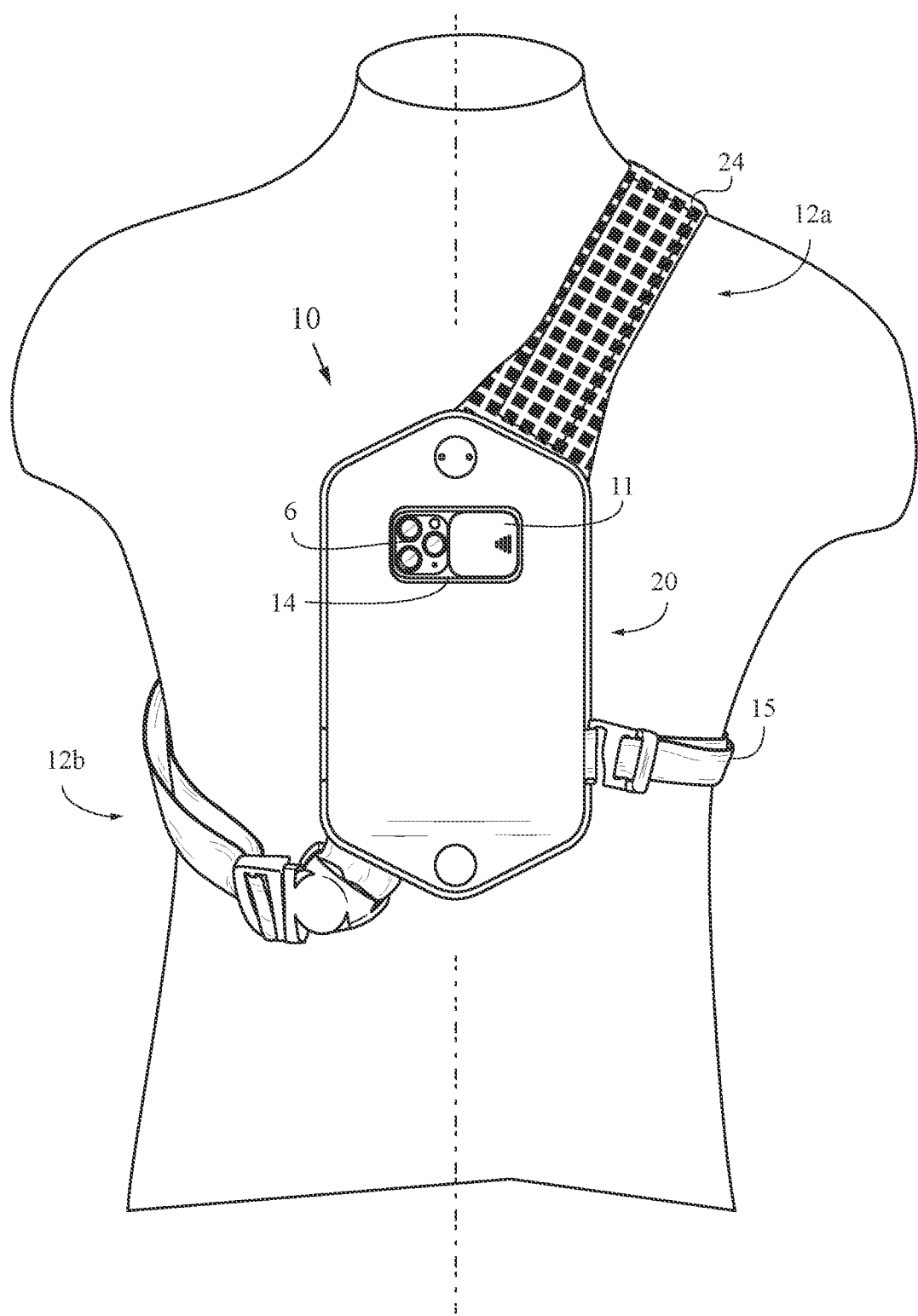
FIG. 27 is an illustration of the vertical positioning of a phone strap on a body with a solar sleeve cover on the strap.

The strap/pack 10 is designed to keep the mobile device vertical, with its "lens" facing forward in position for optimal filming and other lens functions, as shown in FIG. 1 and FIG. 27. Designs include standard vertical placement as well an adaptable feature that allows for a diagonal, in-line with the cross-shoulder strap 12, carry feature that adjusts to vertical when using the phone's camera feature.

Commercial products utilized in practicing the invention include: Common phone Android and Apple Operating systems and voice activation features; Flexible and sturdy wire gooseneck arms; extendable telescoping support arms; adjustable cell phone holder mount; camera phone lens covers; magnetic squeeze clasps—coin purse; locking and quick-release/adjustable 2-end strap clasp.

The present invention is designed to conceal the presence of a phone and its camera lens 6. It is designed to purposefully hold a mobile device (within any holder or accessory) vertically or otherwise stable or purposefully/functionally placed within any accessory/apparel/bag apparatus with the purpose of concealing the mobile device, making it visually indistinguishable from the strap, with the mobile device's camera lens 6 exposed (full visibility with functionality intact) facing outwards, away from the user's body, through the aperture 14 on the main body 20 of the strap 10, as shown in FIG. 27. It is designed to enable the function of capturing video and image as well as other device lens features and functions while the mobile device remains within the strap 10. It is further designed to enable and utilize a mobile device's innate voice activated controls.

The phone is preferably placed on the chest/sternum or central part of the body in order to take photos and video directly in front of the user. If placed otherwise, it may aim upwards, towards the sky. The phone is preferably inserted in a pouch between the front and back cloth, not on the front.

Figure 7:
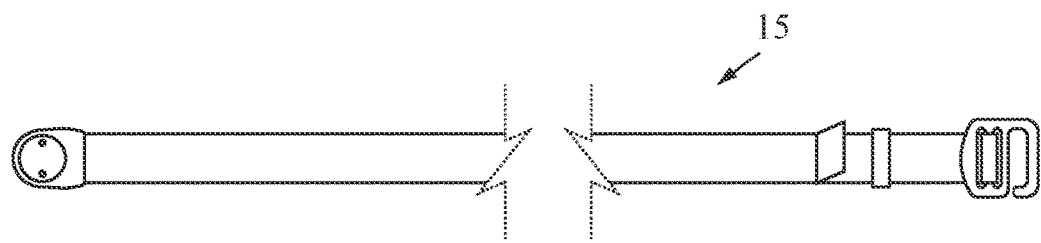
FIG. 7 is a detailed illustration of a stabilizer strap.
Figure 8:
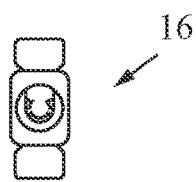
FIG. 8 is a detailed illustration of a sliding keeper.
Figure 9:
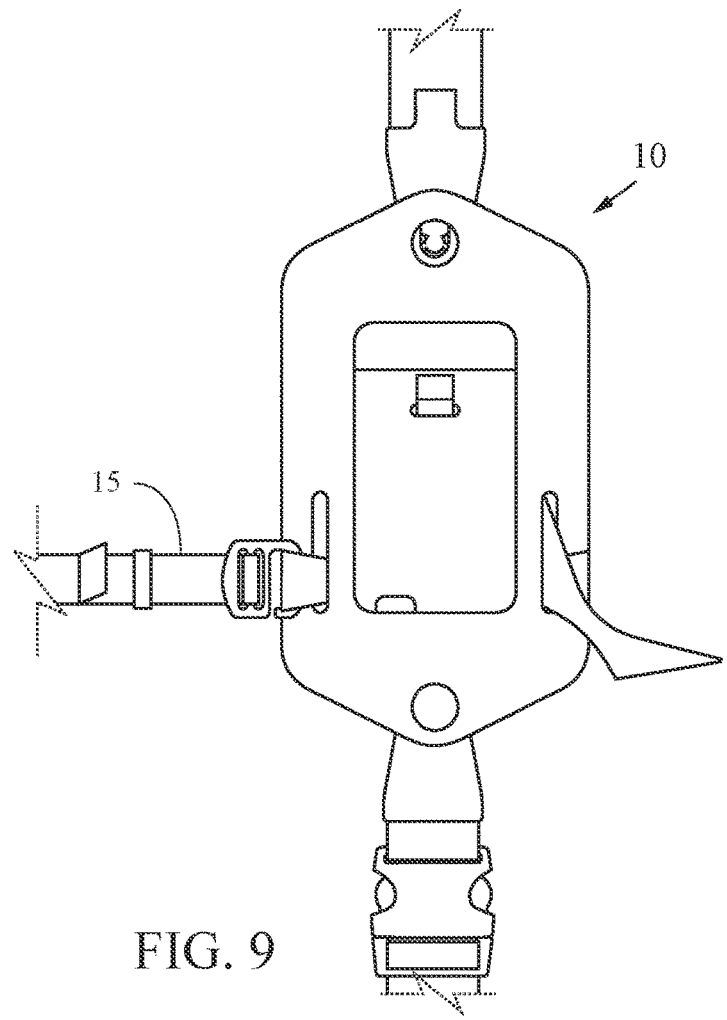
FIG. 9 is an illustration of a stabilizer strap connected to an embodiment of a phone strap.
Figure 10:
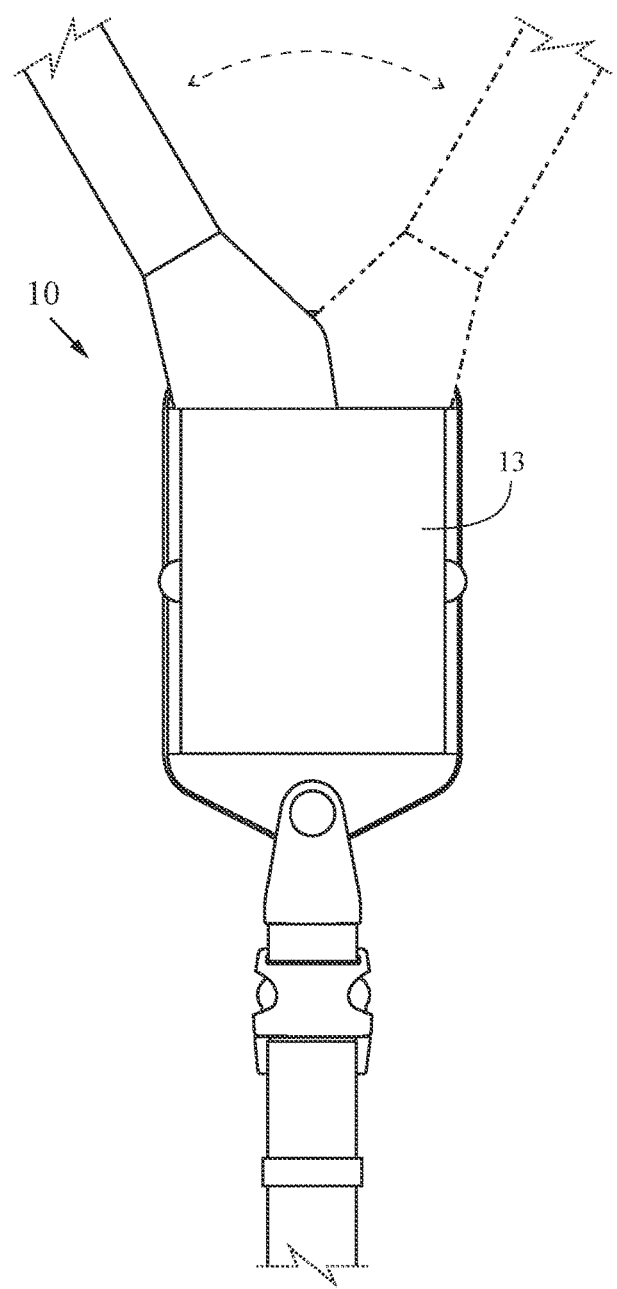
FIG. 10 is an illustration of the back-side of another embodiment of a phone strap.
Figure 11:
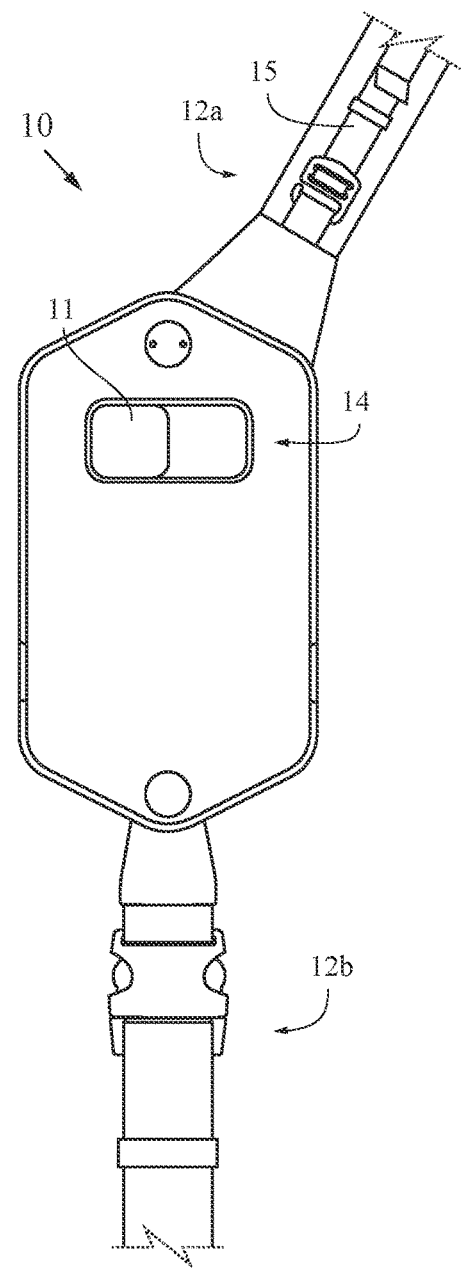
FIG. 11 is an illustration of the front-side of FIG. 10.
Figure 12:
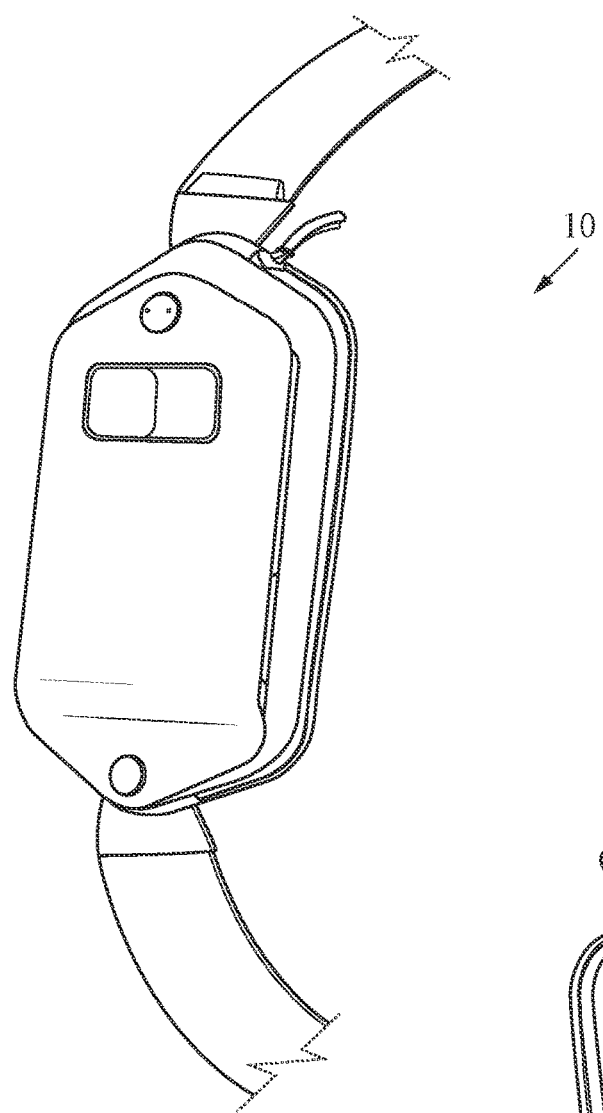
FIG. 12 is a front perspective view of an embodiment of a phone strap.
Figure 13:
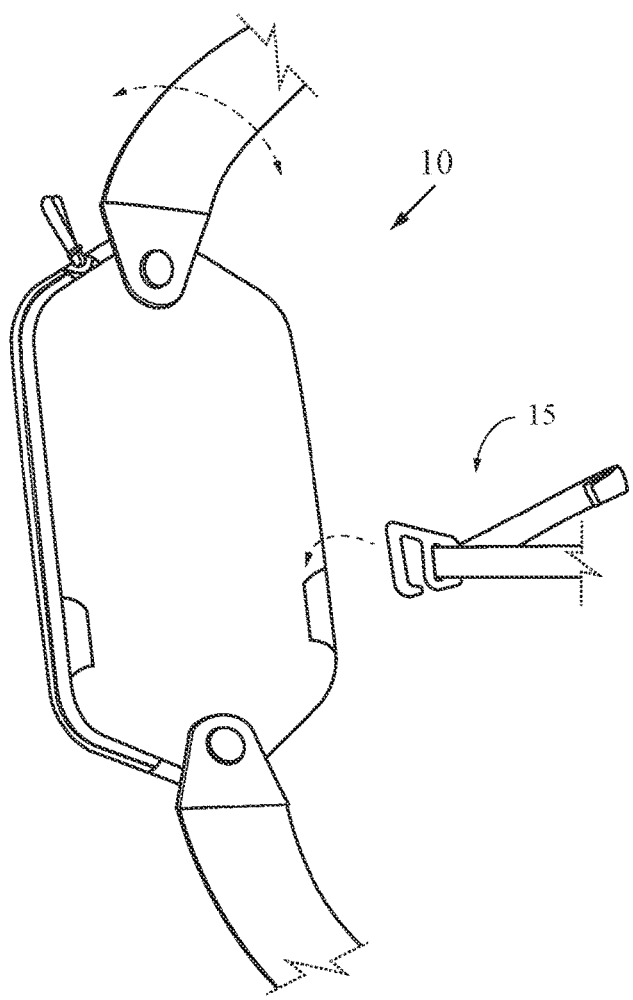
FIG. 13 is a back perspective view of an embodiment of a phone strap.
Figure 14:
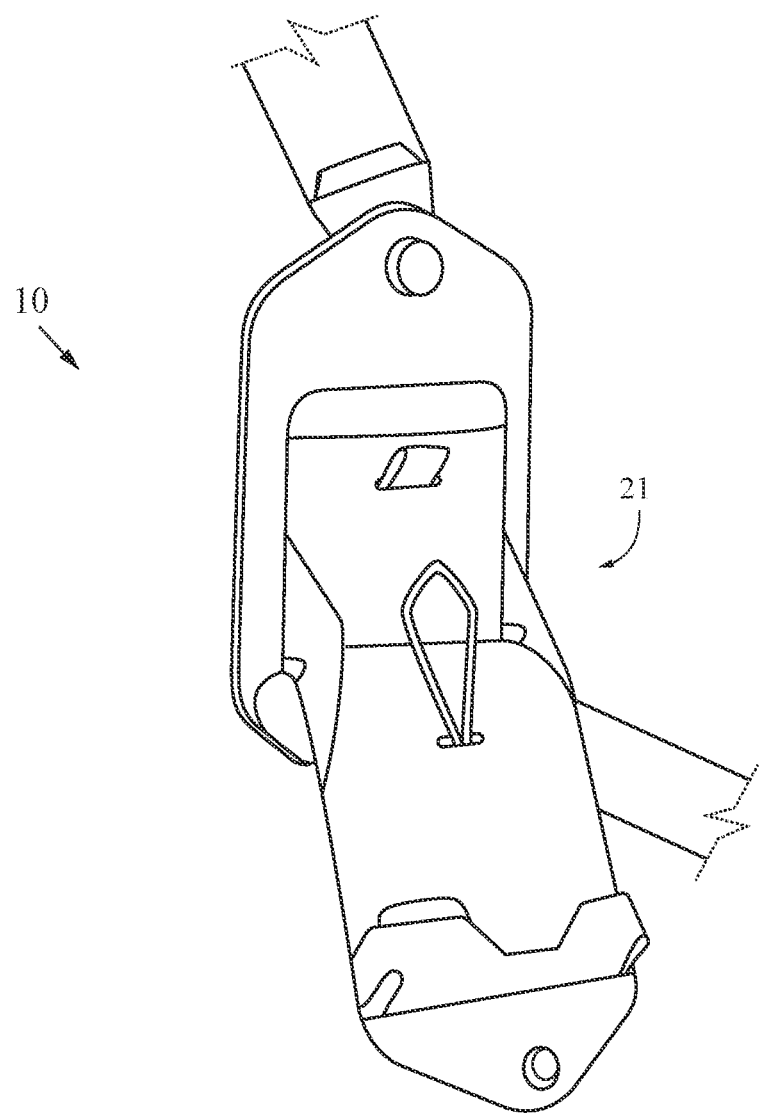
FIG. 14 is an illustration of an internal compartment of a phone strap.
Figure 15:
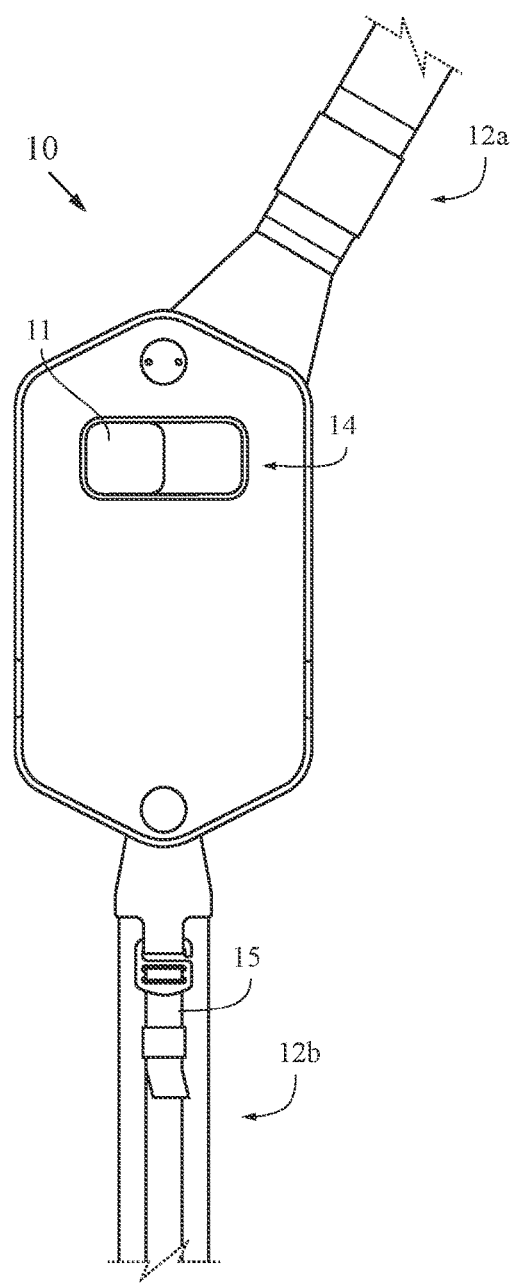
FIG. 15 is an illustration of the front-side of another embodiment of a phone strap.
Figure 16:
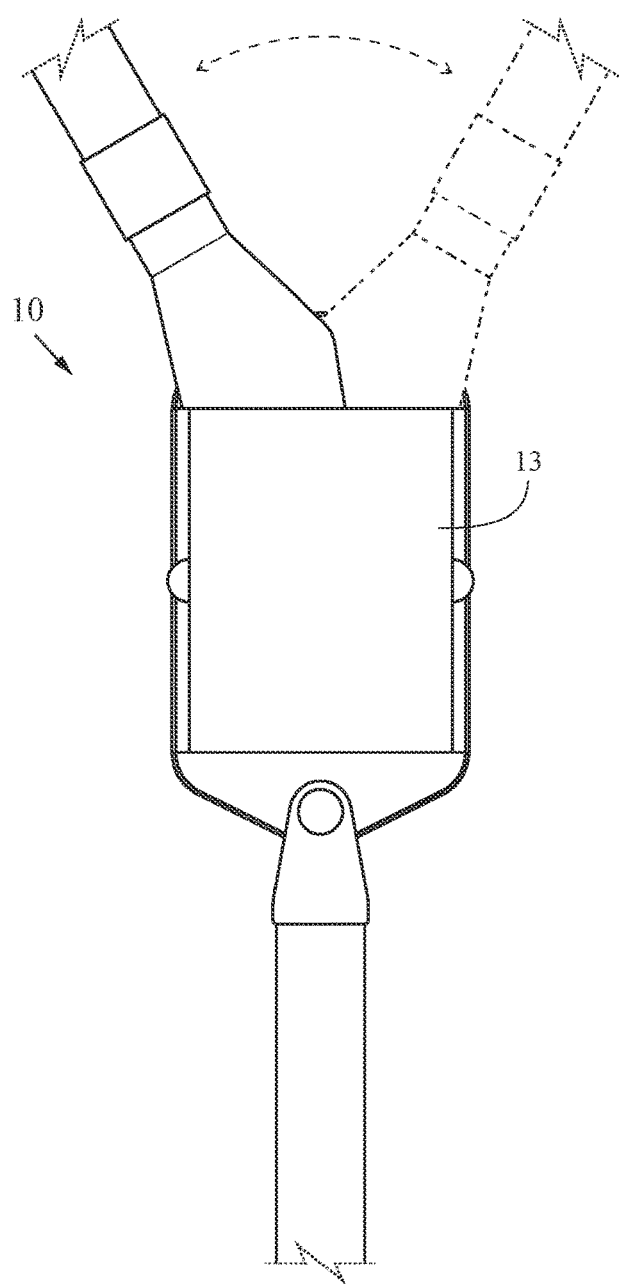
FIG. 16 is an illustration of the back-side of another embodiment of a phone strap.
Figure 17:
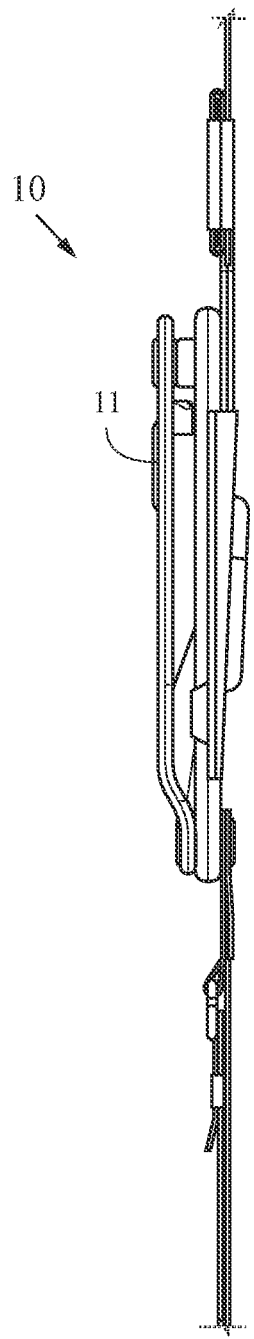
FIG. 17 is an illustration of a side view of another embodiment of a phone strap.
Figure 18:
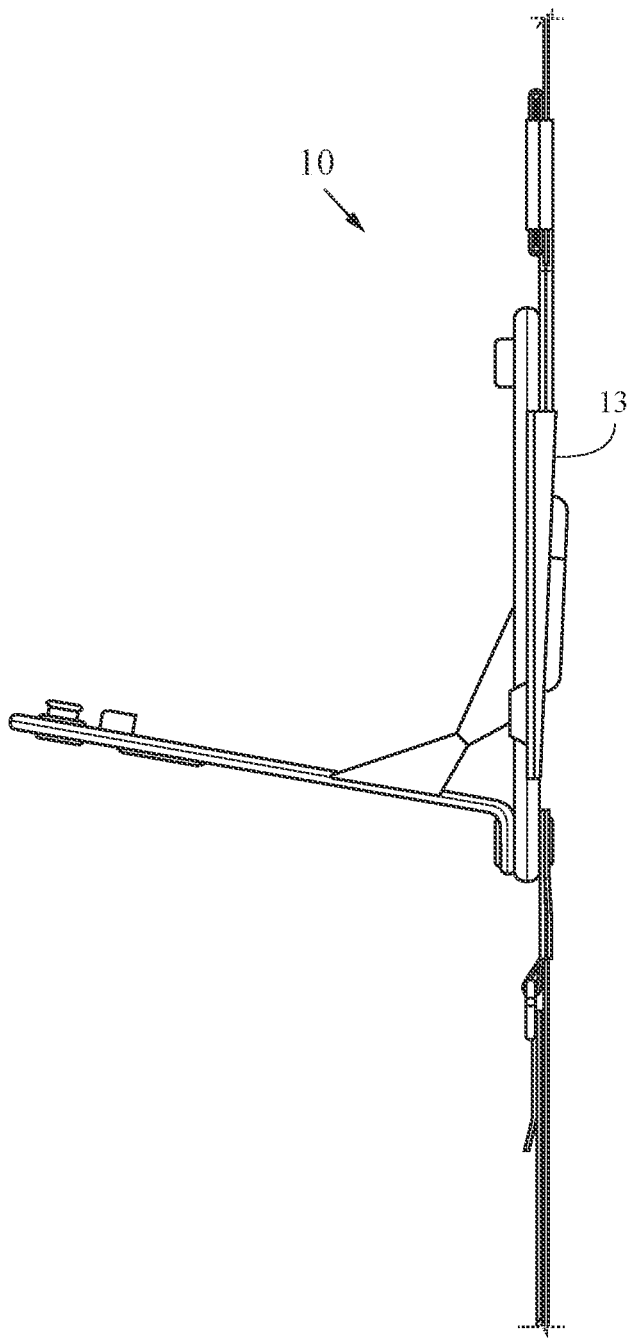
FIG. 18 is an illustration of FIG. 17 in an open position.
Figure 19:
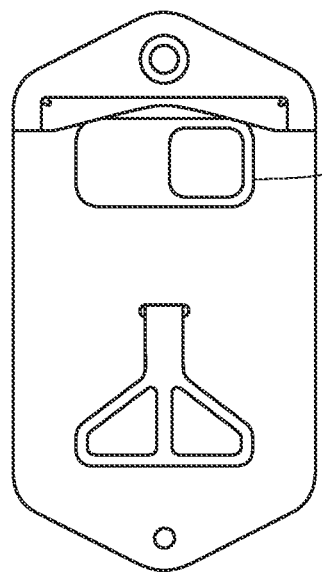
FIG. 19 is an illustration of the interior detail of the main body of FIG. 15.
Figure 20:
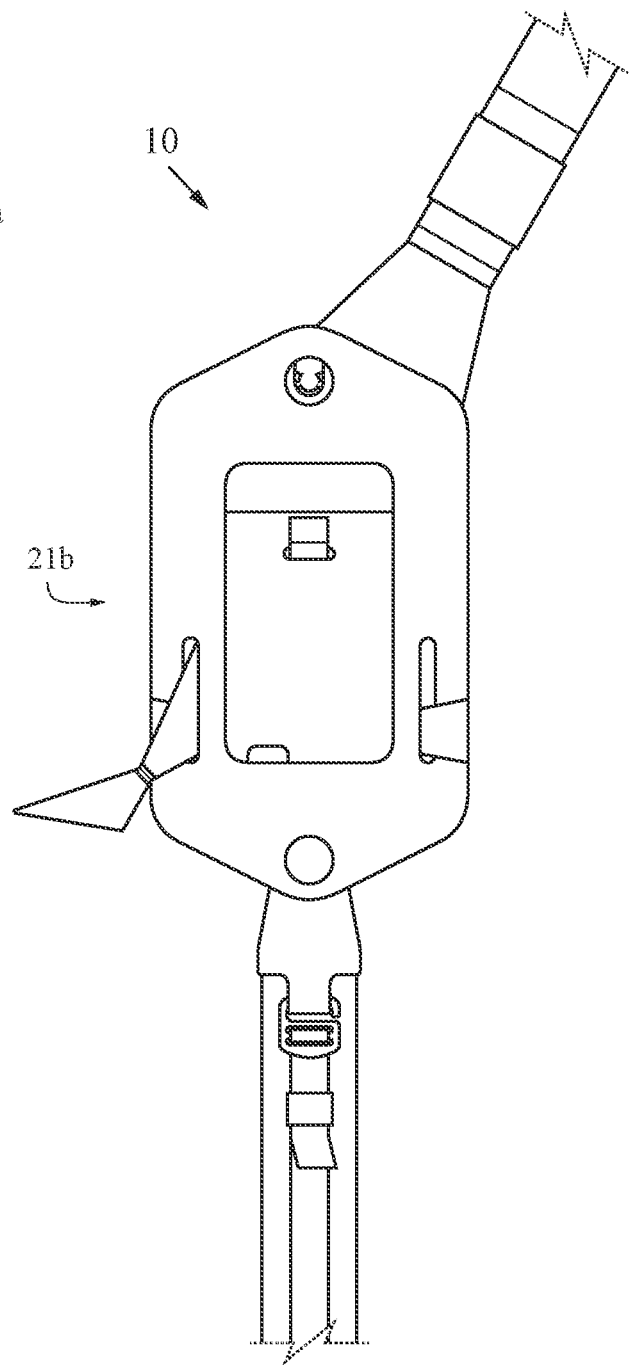
FIG. 20 is an illustration of the interior detail of the main body of FIG. 15.
Figures 21, 22:
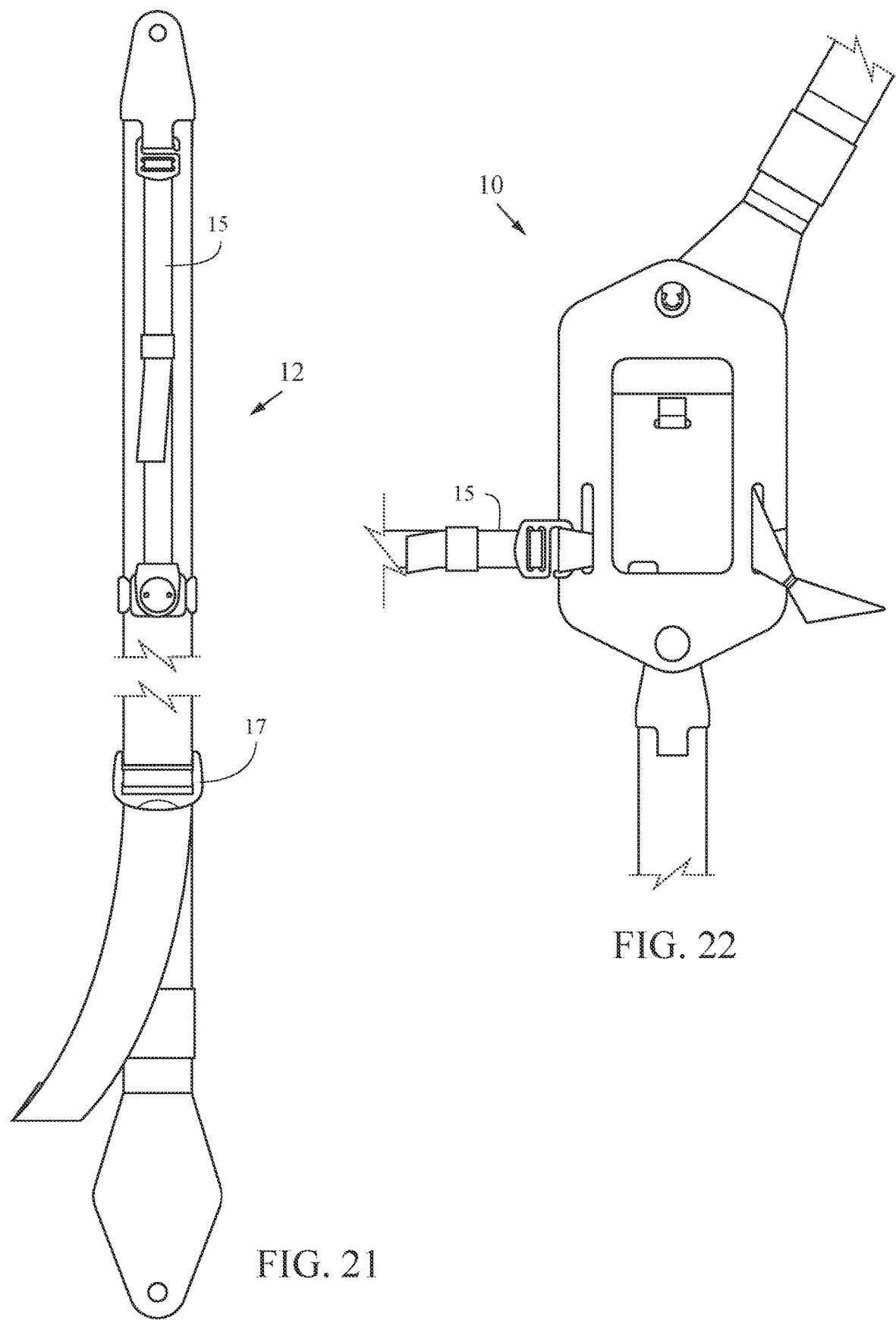
FIG. 21 is a detailed illustration of a shoulder strap.
FIG. 22 is an illustration of a stabilizer strap connected to another embodiment of a phone strap.
Figure 23A:
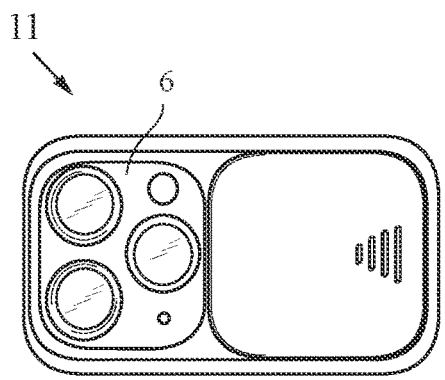
FIG. 23A is a detailed illustration of a lens cover in the open position.
Figure 23B:
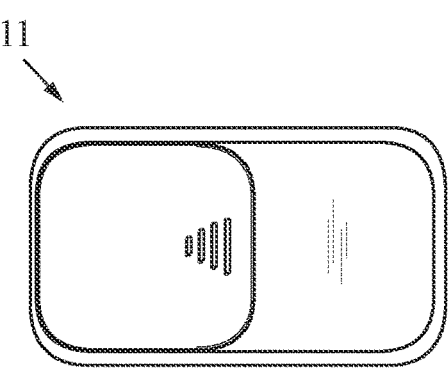
FIG. 23B is a detailed illustration of a lens cover in the closed position.

One embodiment also includes a sport side strap 15 for lateral tension and stability. FIG. 7 is a detailed illustration of the sport strap 15. FIG. 8 is an illustration of the sliding keeper 16 on which the sport strap 15 connects to. FIG. 9 and FIG. 22 show the sport strap 15 connected to the loop behind the gusset on the main body of the strap/pack 10. FIG. 13 shows the sport strap 15 in the vicinity of the gusset, about to be looped. The additional/optional strap 15 provides side support over the user's side-body on the opposite side of where the strap sash angle hangs. It is an elastic or otherwise adjustable VELCRO strap that connects the back of the main strap 12 to the main body 20 for lateral stability. The additional sport strap 15 is housed in-line with the back strap 12, as shown in FIGS. 1, 6, 11, 15, 20 and 21, in alternative embodiments. The sport strap 15 can be repositioned as needed to reach around and connect to the backside of the main body 20.

The lens aperture 14 in the fabric or design body of the strap/pack 10 is concealed through variable means of a tinted plastic, or two-way mirror style plastic, screen, or other technology allowing the camera lens to see through the carrying strap/pack 10 but not to be obviously seen from the outside. An adjustable lens cover 11 feature is created to show or hide the camera depending on the user's desire at the time of use. The lens may be framed to keep the surrounding structure of the lens.

The lens cover 11 can be a see-through concealed cover, such as a two-way mirror, one-way glass, tinted, screen, or other material, used for any fashionable accessory/apparel/bag or specific mobile device holders. It can be adjustable or adaptable to reveal the mobile device's camera lens or completely conceal it from the outside while retaining full camera lens functionality. It fits all lenses and model types through a built-in specific design.

In one embodiment, the lens concealer is a flap or cover. In another embodiment, the lens concealer is a tint or film. In another embodiment, the lens concealer is a plastic external circle or square that covers the outside of the phone and the material of the front of the pack is similar to a wetsuit material that conforms around the specific shape. In another embodiment, the lens concealer is a screen material or the like. In another embodiment, the lens concealer is a camera lens cover that can be closed and opened (similar to a traditional camera shutter lens cover).

The selfie-arm 25 and all components are concealed by the design and is indistinguishable from the cross-body strap/pack 10. The structural support components are revealed and put together to create an extended arm/tripod/support mount to properly position the phone at a distance in front of the user.

A transparent and operable back-end (close to chest) strap 13 with clear plastic allows for full mobile device function without putting the mobile device away and taking it out: camera in a bag—use your device while it's put away.

A quick-adjust/release clasp 17, as shown in FIG. 21 is a preferably inconspicuous clasp that allows for quick adjustment of the strap 12. This enables tightening of the strap 12 for active use and loosening to remove (without unbuckling) and to enable better use of the phone without taking the phone out of the phone strap 10. An alternative embodiment has a clear back end. There may also be a structure similar to a collapsible diagonal camera holder.

One embodiment is a phone strap 10 for concealing a mobile phone. The phone strap 10 comprises a main body 20 and a cover 11. The main body 20 defines an internal compartment 21 in an upper front section. The main body 20 also has a lens aperture 14 therethrough to the internal compartment. The lens cover 11 is positioned over the lens aperture 14. The internal compartment 21 is configured to hold a mobile phone 5 with a camera of the mobile phone 5 positioned at the lens aperture 14. The lens cover 11 is designed to conceal the lens aperture while permitting lens' functionality through the lens cover 11. A front panel of the main body 20 preferably encompasses the lens cover 11 and is preferably interchangeable and/or modular. The main body 20 is also preferably interchangeable and/or modular. Each strap 12 is also preferably interchangeable and/or modular. Strap covers for the strap 12 are also preferably interchangeable and/or modular. Accessories for the phone strap 10 are also preferably interchangeable and/or modular.

Another embodiment is a garment for concealing a mobile phone. The garment comprises a main body defining an internal compartment in an upper front section, the main body also having a lens aperture therethrough to the internal compartment. The internal compartment is configured to hold a mobile phone with a camera and all lens features of the mobile phone positioned at the lens aperture. The lens aperture is concealed while permitting lens' functionality.

Figure 26:
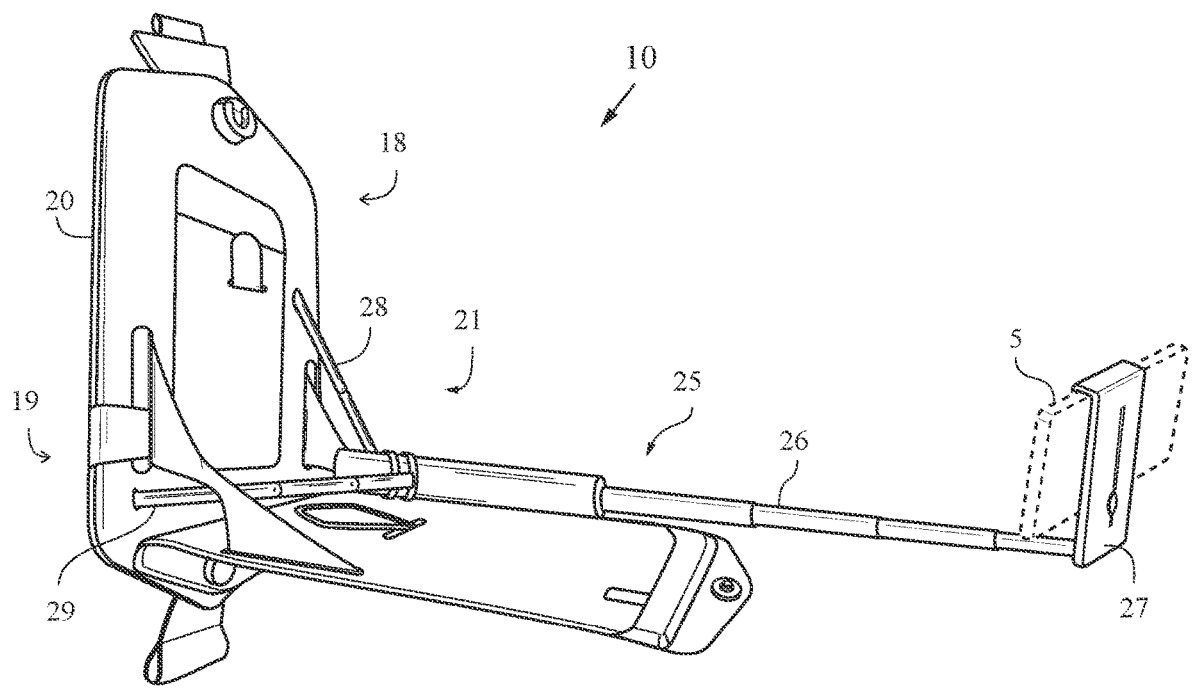
FIG. 26 is an illustration of an extendable arm feature of a phone strap in an extended position.
Figure 26A:
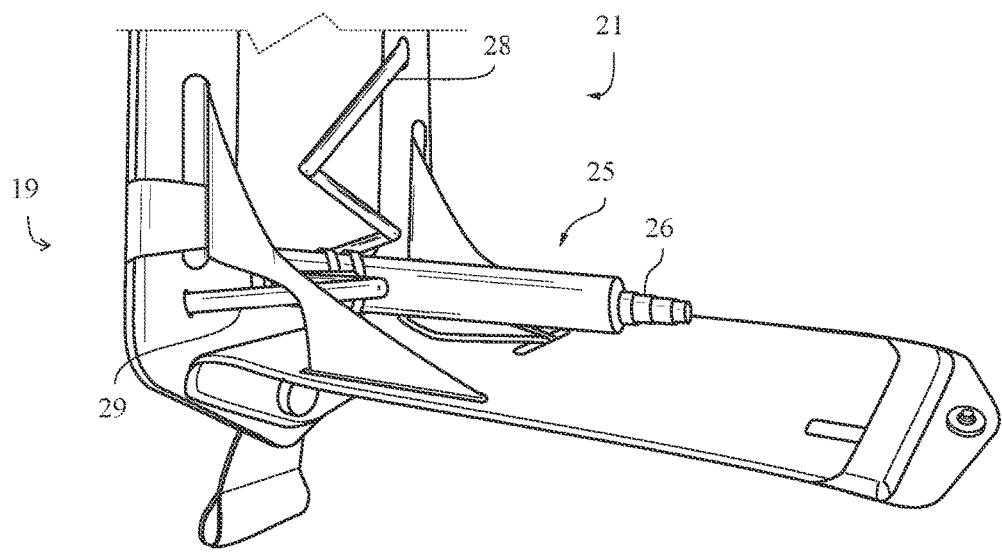
FIG. 26A is a detailed illustration of the extendable arm of FIG. 26 in a resting position.

Another embodiment is a phone strap 10 with an extendable arm 25, as shown in FIG. 26. The phone strap 10 comprises a main body 20 and an extendable arm 25. The main body 20 has an upper section 18 and lower section 19. The extendable arm 25 is attached at the upper section 18 and the lower section 19 of the main body 20, the extendable arm 25 comprises an extension arm 26 with a phone holder 27, a structural support member 28 and an under structural support member 29. The extendable arm 25 is designed to rest on the main body in a resting state, and extending forward from a body of user in an extended state. FIG. 26A is a detailed illustration of the extendable arm 25 in a resting state.

In one embodiment, the extendable arm 25 is a folding arm with a support. In another embodiment, the extendable arm 25 is telescoping. The arm may have a support arm to maintain lateral stability similar to a hinge of a folding table hinge that goes within the telescoping arm.

The selfie stick will work on the waist as well as over the shoulder.

The internal compartment 21 is preferably configured to hold a mobile phone in an upright position. The internal compartment is alternatively configured to hold a mobile phone in a diagonal position.

The cover 11 is preferably a two-way mirror or composed of a tinted plastic or a screen. The main body preferably comprises a magnet receptor and the cover comprises a magnet to permit the cover to be positioned in an open state exposing the lens aperture. The cover preferably comprises a sign holder on an interior surface. The main body preferably comprises a lower section composed of a flexible material.

The phone strap 10 further comprises an extendable arm 25 designed to hold a mobile phone 5 at an extended end. The extendable arm preferably comprises a structural support member and an under structural support member. The extendable arm is preferably telescoping or folding. The extendable arm is preferably composed of a rigid wire, a folding plastic or a sturdy flexible material.

The phone strap according further comprises a locking and quick release adjustable two end strap tensioner buckle.

The main body 20 is preferably designed to enable voice activation of all mobile phone voice controls. An internal surface of the main body preferably defines an interior wall of the internal compartment, which is transparent and configured to allow operation of a mobile phone by a user. The main body is preferably configured to be worn over a shoulder of a user. The main body is preferably composed of a fabric material. The main body preferably has a length ranging from two feet to four feet, and a width ranging from two inches to five inches. The internal compartment is preferably designed to be positioned on a chest of a user. The lens aperture preferably has a diameter of 0.25 inch to 1.0 inch. A length of the main body is preferably adjustable.

The utility of the phone strap 10 includes the following: hands-free filming by a user with the front dash cover (face of the strap) up; use or view a phone screen with the front dash cover perpendicular to the wearer's body; the device fits all types and sizes of phones; interchangeable components for different types of front covers (e.g. phone pouch stays the same and the front covers are replaceable for different designs); the phone strap can be worn with the pouch diagonal (crossbody), vertical in center of torso, vertical offset, or around a user's waist to film in all ways of use; filming with a phone using a Bluetooth lens cover slide to initiate a phone shutter button; and filming third-person POV with the selfie arm component.

The components of a preferred embodiment of the phone strap include a crossbody strap with a pouch. The crossbody strap includes the following: pivots; magnetic fasteners/closure; overlapping pockets in back of pouch; an external battery pack pocket—which allows for wired and wireless phone charging; a RFID/EMF blocking panel; an expandable/flexible material; and a waterproof pocket The components of a preferred embodiment of the phone strap also include a phone holder which includes: an exterior (face)—which conceals, secures, and protects the entire phone and lens, and a top lock connection design for quick release and quick closure; an interior—when up/closed/secure—holds a phone vertical between a front panel and a pouch face, and when down—holds a phone perpendicular to the strap and the wearer's body; a dash platform—which secures a phone to the top right with tension from the bottom left, and allows all phones sizes with and without cases to fit securely and with forward facing camera lens in position of the front dash; and a dashboard—which operates like a dashboard.

The components of a preferred embodiment of the phone strap also include a lens cover slide, which includes: a normal lens cover—vertical, horizontal, or other means for a flap or cover to conceal the cell phone device camera lens(es); a Bluetooth shutter; and a manual shutter.

The components of a preferred embodiment of the phone strap also include a selfie stick, which: extends a phone in front of a body and a phone pouch; provides lateral and vertical support to eliminate sway; acts as a self-balanced stabilizer hand to minimize video bounce; and provides options of telescoping or folding outward from the phone strap.

The components of a preferred embodiment of the phone strap also include a ride-along stabilizer strap, which: stabilizes around the wearer's torso to connect to the other side of the pouch to maintain stable vertical position; pivots to position in-line with the strap and rotates to wear around the torso; and provides a single fixture quick detachment and attachment.

The components of a preferred embodiment of the phone strap also include a leash clip dog waste bag holder. A leash clip may have carabiners on both ends of a short nylon strap and there may be a dog waste bag dispenser fixed in between.

The components of a preferred embodiment of the phone strap also include a strap sleeve covers, shown in FIG. 27, which includes: a solar panel covered strap cover 24 works for this phone strap but also other types of bags; a flexible solar material attached to other fabric to cover the length of the straps, which attaches with VELCRO or zippers; a cable attached from the solar panel to run down the strap into the battery pack in the front of the pack to store the charge from the solar panel strap sleeve cover; and means to plug directly into the phone if the battery is not available.

Figure 24:
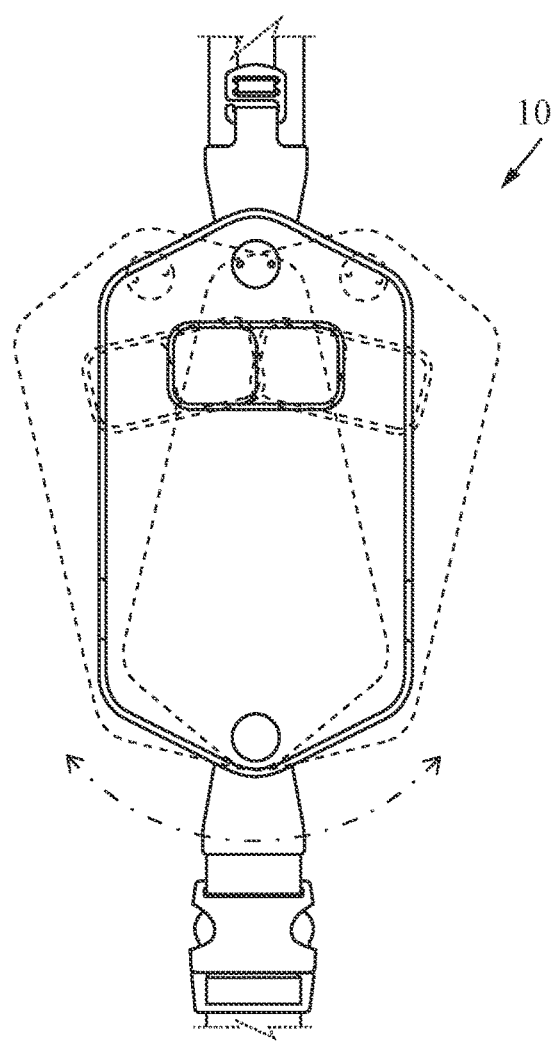
FIG. 24 is an illustration of an alternative front cover that pivots.
Figure 25:
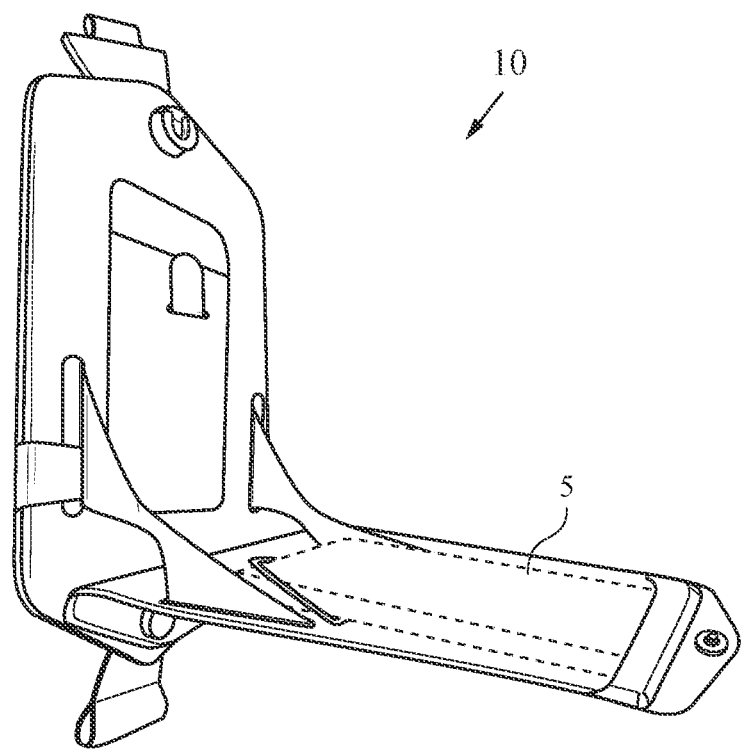
FIG. 25 is an illustration of a phone inserted into the interior of a phone strap.

Extension components include the option of front dash, and the phone rotates on pivot arm/hinge base, as shown in FIG. 24, with a design that includes: a phone within the front dash that rotates/pivots (not the bag); and a phone and front dash (and support arm mechanism) that can flip/reverse so that the phone screen and "interior" of the phone dash face and lock forward (facing out). The phone locks the same, but the front dash cover is not connected to the pivot point at the bottom of the bag. The rotation mechanism (tiltawhirl axis type that also serves as the bottom front dash hinge) is connected to the bottom of the bag and the middle of the front dash cover. A rotation hinge folds up and down from the bottom just like the others. A Locking thumb screw allows it to lock at different angles rather than just parallel to the ground. A pivoting center axis allows the front dash and the phone to rotate and pivot and lock into place. A bottom hinge/arm can flip at the bottom and rotate and lock.

Additional back strap cover designs include a sport (yoga mat holder), and a water bottle/pouch holder (camel back). A sensor and a tracker can also be installed (similar to a TILE brand product tracker). The phone strap can also include programmable phone controls (live video, photo, emergency button, flashlight). External add-on components such as a speaker, a rear camera, VR components and drone components can also be included.

A preferred embodiment of the selfie stick design includes is a telescoping function that lays stowed next to the phone on the dashboard. When in the down position, the vertical hinge (similar to a folding table) locks to keep the down position perpendicular to the body. Once extended, with the phone out/extended away from the dash, a lateral kickstand similar to the folding table hinge locks horizontally to prevent lateral sway. A phone holder, when stowed, is a rubber material, and the phone holder is preferably connected to the selfie stick so it is always ready to extend or collapse and fold up. Requirements of a preferred embodiment of the selfie stick include: compact and hidden (collapsible and extendable); lightweight and slim; stabilized vertical and lateral sway; strong enough to hold phone at length; record stable video; hold all phones with and without cases; easily and secure phone attachment; and Bluetooth remote within reach.

A preferred embodiment of the Bluetooth lens cover design includes: lens cover 11 has an on/off switch within the recessed section; a battery is within the mechanism or within the front panel; an option for non-battery powered shutter that runs a small chord to the bottom of the front cover to the bottom inside of the front dash to plug into the bottom of the phone; other functions operate just like current BLUETOOTH selfie stick shutter buttons with regards to how it connects/pairs to a phone. The operations/requirements include; it keeps a camera app running in the background: a Bluetooth shutter will start and stop camera, but requires a predecessor of having the camera app open/running; a shutter feature—which starts a camera and stops a camera (photo or video); Android, iOS and Waway compatible; On and off switch for while in use; charge via wireless, USB-C/iPhone charger, or replaceable (rechargable) battery; non-obvious aesthetics when not in use; and no half-position available, e.g. user confidence in on/off, no accidental recording or no thinking it's recording when it isn't.

The phone strap 10 also includes a "camera available" indicator, which is a transparent package and "flap" indicator of use of a camera. Used if a user "must express if you are currently filming in public."

A preferred embodiment of the solar charge strap cover includes: wraps around current straps with VELCRO or unique straps/buttons/zipper; has a chord that reaches down into the strap into the phone charger in the pouch; has connecters to connect and create a flowing look with all bags; and has flexible solar panel material on the outside back wraps around similar to a SAMSUNG s9 screen. The requirements include: a sock-style sleeve that covers the back strap; flexible material solar panels; sturdy enough not to twist to keep solar panels facing out (neoprene); stores charge to battery pack or direct to phone; attaches to a bag and stays in place; removable; and creates a maximum charge.

A preferred embodiment of the dog leash clip w/waste bag holder design includes: a bag dispenser; leash clip attaches to the phone strap and dog leash; leash clip attaches to pants waistline without sliding forward or ripping pants; and leash held at a shorter distance.

The main body preferably defines an internal compartment in an upper front section, the main body also having a lens aperture therethrough to the internal compartment, and a cover positioned over the lens aperture. The internal compartment is preferably configured to hold a mobile phone with a camera of the mobile phone positioned at the lens aperture. The lens cover 11 is designed to conceal the lens aperture while permitting filming through the lens cover 11.

The internal compartment is preferably designed to hold multiple sized phones with a spring-loaded or other support device that holds the phone to the top of the phone compartment, thereby enabling different sized phones to have their "lens" components to align with the aperture in the phone strap.

The phone strap or garment preferably allows for lifting off of a chest of a user quickly and easily to operate the phone. The phone strap or garment preferably further comprises a sport side strap for lateral tension and stability. The sport side strap provides side support over a user's lats on the opposite side of where the phone strap angle hangs; an elastic or otherwise adjustable Velcro strap that connects the back of the main strap to the front pack for lateral stability; and the additional elastic strap is housed in-line with the back strap and can repositioned as needed to reach around and connect to the back side of the front pack.

The lens' functionality preferably comprises filming, viewing, scanning or projecting.

The selfie "arm" also preferably contains a selfie "hand" and "wrist" that holds the phone in front of a user and allows adjustment; and the positioning of the selfie arm overall ensures that the phone is at eye/chest level or the appropriate height for $3^{rd}$ person view recording.

The tensioner buckle preferably allows the excess male end of the strap to be concealed within the body of the overall pack.

The internal compartment is preferably configured for the rotation of the phone from diagonal into a vertical position or horizontal position and configured to lock the phone in place.

The extendable arm preferably has a concealed support structure behind, under or within an overall pack. The extendable arm is preferably removable.

The phone strap 10 or garment is preferably configured to be worn around a waist of a user as a secondary position or use of a pack overall.

The main body is also preferably configured to be a holder of daily essential items.

The phone strap preferably also includes a dashboard design to hold and maintain the mobile phone within a front panel substantially perpendicular to the main body and a wearer's torso wherein the bottom is fixed and the top releaseable/folds down.

The phone strap preferably also includes a front panel quick locking and release mechanism to attach the main body, and/or locking mechanisms to secure the phone to allow full/direct phone screen access.

The strap, attached to the main body has an associated 'ride-along' smaller overlapping stabilizer strap that attaches and pivots at the center of the strap and attaches to the opposite side of the main body to further secure the strap and main body to the wearer/user.

A seflie arm of the phone strap allows for third person filming.

A dashboard front panel rests perpendicular to the body of the main body and a wearer's torso (with a quick release and locking mechanism at the top of the front panel to connect to the main body.

A lens cover slide has three lens cover modes and a Bluetooth slide cover to initiate mobile device camera shutter interaction. A main body front center pocket holds an external battery charger.

A front panel utility and function is applied to outer garments such as jackets, vests, and other types of wear.

The apparatus/phone strap has an interchangeable and modular design such that there are different main bodies (fixed or rotatable) and different front panels (different front panel types e.g. Bluetooth shutter, selfie arm, and different types and sizes of phones. The strap covers for device solar charging, water bottles, yoga mat holders and other types of strap covers. The strap allows for attachment of other wearable accessories (e.g. the dog waste clip).

The main body may be positioned in different pre-fixed positions around the strap (locks into place via magnets or clips). It also can be worn diagonal, vertical on the torso, or around the waist).

For the phone to lock into place the tensioner mechanisms hold the bottom of the phone and pull it up and to the right against the top of phone holding mechanism thereby positioning any size or type of phone to have the lens in the correct placement of the lens aperture.

The main body alternatively comprises a magnet receptor and the lens cover comprises a magnet to permit the cover to be positioned in an open state exposing the lens aperture. The main body alternatively comprises a lens cover slides to cover the lens aperture to permit the cover to be positioned in an open state exposing the lens aperture. The main body alternatively comprises a lens cover flap to cover the lens aperture to permit the cover to be positioned in an open state exposing the lens aperture.

Preferably, at least one of a plurality of strap components (strap, main body/bag, front panel and accessories) is modular/interchangeable for a plurality of utilities and designs. Alternatively, all of a plurality of strap components (strap, main body/bag, front panel and accessories) are modular/interchangeable for a plurality of utilities and designs.

From the foregoing it is believed that those skilled in the pertinent art will recognize the meritorious advancement of this invention and will readily understand that while the present invention has been described in association with a

I claim as my invention the following:

1. A phone strap or wearable pack/bag for concealing a mobile phone or other advanced personal technology location and filming device, the phone strap comprising:
   a main body defining an internal compartment in a front section, the main body also having a lens aperture therethrough to the internal compartment; and
   a lens cover positioned over the lens aperture;
   wherein the internal compartment is configured to hold a mobile phone with a camera of the mobile phone positioned at the lens aperture;
   wherein the lens cover is designed to conceal the lens aperture while permitting lens' functionality through the cover in a first mode, or blocking the lens' functionality in a second mode.

2. The phone strap according to claim 1 the lens cover is a two-way mirror or composed of a tinted plastic and/or a solid blocking screen lens cover.

3. The phone strap according to claim 1 wherein the main body comprises a lens cover slides to cover the lens aperture to permit the cover to be positioned in an open state exposing the lens aperture.

4. The phone strap according to claim 1 wherein the main body comprises a flexible section composed of a flexible material with a plurality of overlapping back pockets, wherein the main body is configured for positioning in a plurality of pre-fixed positions by locking into place via a plurality of magnets or a plurality of clips, wherein the phone strap is worn diagonally, vertical on a torso of a user, or around a waist of a user.

5. The phone strap according to claim 1 further comprising an extendable arm designed to hold a mobile phone at an extended end, the extendable arm comprises a structural support member and an under structural support member for vertical and horizontal stability.

6. The phone strap according to claim 1 further comprising a locking and quick release adjustable two end strap tensioner buckle.

7. The phone strap according to claim 1 wherein the main body is designed to enable voice activation of all mobile phone voice controls, and configured to allow access to each of the camera lenses of a mobile phone.

8. The phone strap according to claim 1 wherein an internal surface of the main body defining an interior wall of the internal compartment is transparent and configured to allow operation of a mobile phone, or a plurality of locking mechanisms to secure the phone to allow full/direct phone screen access.

9. The phone strap according to claim 1 wherein the main body has a length ranging from two feet to four feet, and a width ranging from two inches to five inches.

10. The phone strap according to claim 1 wherein the lens aperture has a diameter of 0.25 inch to 1.0 inch.

11. The phone strap according to claim 1 further comprising a dashboard design to hold and maintain the mobile phone within a front panel substantially perpendicular to the main body and a wearer's torso wherein the bottom is fixed and the top releaseable/folds down.

12. The phone strap according to claim 1 further comprising a front panel quick locking and release mechanism to attach a top of the main body of the phone strap or bag.

13. The phone strap according to claim 1 wherein a strap is attached to the main body and has an associated overlapping stabilizer strap that attaches and pivots at the center of the strap and attaches to the opposite side of the main body to further secure the strap and main body to the wearer.

14. The phone strap according to claim 1 further comprising a main body front center pocket configured to hold an external battery charger for proximity charging of a mobile phone.

15. The phone strap according to claim 1 wherein at least one of a plurality of strap components is modular/interchangeable for a plurality of utilities and designs.

16. An apparatus for concealing a mobile phone, the apparatus comprising:
   a main body defining an internal compartment in a front section, the main body also having a lens aperture therethrough to the internal compartment; and
   wherein the internal compartment is configured to hold a mobile phone with a camera and all lens features of the mobile phone positioned at the lens aperture;
   wherein the lens aperture is concealed while permitting lens' functionality,
   wherein the apparatus is configured for mobile phone filming in a vertical position or a horizontal position.

17. The apparatus according to claim 16 further comprising a lens cover slide comprising three lens cover modes and a BLUETOOTH slide cover to initiate a mobile phone camera shutter mechanism.

18. The apparatus according to claim 16 further comprising a strap capable of attaching a solar panel charger, a water bottle, a dog waste clip, or a yoga mat holder.

19. The apparatus according to claim 16 further comprising an extendable arm designed to hold a mobile phone at an extended end.

20. A phone strap for a mobile phone, the phone strap comprising:
   a main body having an upper section and lower section;
   an extendable arm attached at the upper section and the lower of the main body, the extendable arm comprising an extension arm with a phone holder, a structural support member and an under structural support member;
   wherein the extendable arm is designed to rest on the main body in a resting state, and extending forward from a body of user in an extended state.

21. The phone strap according to claim 20 wherein the extendable arm extends from two feet to four feet from the main body.

22. The phone strap according to claim 20 wherein the main body defines an internal compartment in an upper front section, the main body also having a lens aperture therethrough to the internal compartment; and
   a cover positioned over the lens aperture;
   wherein the internal compartment is configured to hold a mobile phone with a camera of the mobile phone positioned at the lens aperture;
   wherein the cover is designed to conceal the lens aperture while permitting filming through the cover.

23. The phone strap according to claim 20 wherein the main body is designed to enable voice activation of mobile phone camera controls.

24. The phone strap according to claim 20 wherein the extendable arm allows for third person filming.

\* \* \* \* \*